(12) United States Patent
Fritsch et al.

(10) Patent No.: US 8,276,764 B2
(45) Date of Patent: Oct. 2, 2012

(54) PROCESS FOR PRODUCING A POLYMER MEMBRANE, AND POLYMER MEMBRANE

(75) Inventors: Detlev Fritsch, Reinbek (DE); Gisela Bengtson, Hamburg (DE); Katrin Ebert, Lüneburg (DE); Joachim Koll, Schwarzenbek (DE); Petra Merten, Lauenburg (DE)

(73) Assignee: Helmholtz-Zentrum Geesthacht Zentrum fur Material-und Kustenforschung GmbH, Geesthacht (DE)

( * ) Notice: Subject to any disclaimer, the term of this patent is extended or adjusted under 35 U.S.C. 154(b) by 741 days.

(21) Appl. No.: 11/899,877

(22) Filed: Sep. 6, 2007

(65) Prior Publication Data

US 2008/0004457 A1 Jan. 3, 2008

Related U.S. Application Data

(63) Continuation of application No. PCT/EP2006/001561, filed on Feb. 21, 2006.

(30) Foreign Application Priority Data

Mar. 10, 2005 (DE) .......................... 10 2005 011 544

(51) Int. Cl.
*B01D 71/02* (2006.01)
*B01D 71/38* (2006.01)
*B01D 53/22* (2006.01)

(52) U.S. Cl. .............. 210/503; 210/500.22; 210/500.25; 427/246; 96/4

(58) Field of Classification Search ................... None
See application file for complete search history.

(56) References Cited

U.S. PATENT DOCUMENTS

| 4,970,034 A | * | 11/1990 | Ly et al. | ............. 264/46.4 |
| 6,071,406 A | | 6/2000 | Tson | |
| 2003/0141238 A1 | * | 7/2003 | Herczeg | ........... 210/321.87 |

OTHER PUBLICATIONS

Ziegler et al. "Palladium modified porous polymeric membranes and their performance in selective hydrogenation of propyne", Journal of Membrane Science 187 (2001), pp. 71-84.
Illinitch et al. "Nanosize Palladium Loaded Catalytic Membrane: Preparation and Cis-Trans Selectivity in Hydrogenation of Sunflower Oil", (1998) Elsevier Science B.V., p. 55-61.
Veldsink, "Selective Hydrogenation of Sunflower Seed Oil in a Three-Phase Catalytic Membrane Reactor", (2001) AOCS Press, JAOCS, vol. 78, No. 5, pp. 443-446.
Fritsch et al. "Catalytic Polymer Membranes for high Temperature Hydrogenation of viscous Liquids", Advanced Engineering Materials 2006, 8 No. 5, pp. 386-389.

* cited by examiner

*Primary Examiner* — Krishnan S Menon
(74) *Attorney, Agent, or Firm* — Michaud-Kinney Group LLP (57) ABSTRACT

The invention relates to a process for producing a polymer membrane, the polymer membrane being produced from a solution, in particular a casting solution, comprising at least one first polymer. The invention further relates to a polymer membrane. The process of the invention is distinguished by the fact that a water-soluble second polymer and/or oligomer that forms phases in the solution is part of the solution. The polymer membrane of the invention, preferably produced by the process of the invention, has an oil flow rate, in particular of a refined edible oil, of greater than 200 l/m² h bar at 60° C.

15 Claims, 6 Drawing Sheets

Pluronic F127, ~12 000 g/mol

PROCESS FOR PRODUCING A POLYMER MEMBRANE, AND POLYMER MEMBRANE

CROSS-REFERENCE TO RELATED APPLICATIONS

This application is a continuation of and claims priority to International Patent Application No. PCT/EP2006/001561 filed on Feb. 21, 2006, which claims priority to German Patent Application No. 10 2005 011 544.6 filed on Mar. 10, 2005, subject matter of these patent documents is incorporated by reference herein in its entirety.

FIELD OF THE INVENTION

The invention concerns a method for making a polymer membrane, particularly a microporous one, whereby the polymer membrane is made from a solution, particularly a casting solution, comprising at least a first polymer. The invention further concerns a polymer membrane which preferably is made according to the corresponding method. Finally, the invention concerns a method for operating a membrane reactor.

BACKGROUND OF THE INVENTION

Oils as viscous fluids cannot be selectively hydrogenated by standard hydrogenating techniques. Because of the high viscosities their transport to a catalyzer is limited. Also if they are thinned to a lower viscosity by solvents, the usual heterogeneous metal catalyzers, which are applied to a highly porous matrix of carrier material, cannot be used to advantage. The necessarily large catalytic surface area is achieved by the high dispersion of the metal into the pores of the carrier. Since by the slow diffusion of the long chained compounds into the pores a complete hydrogenation of all double bonds—in the case of edible oils for example, triglycerides of stearic acid—takes place, and these products block the pores and therewith the catalyzer.

The possibility of working with strong dilution is of little sense, since first the solvent has to be again expensively separated, and in the case of edible oils a health danger cannot be excluded. A technical solution for the hydrogenation of edible oils has been found in the use of nickel-carrier catalyzers where the metal is applied to a very fine grained catalyzer carrier, which again has to be expensively practically entirely separated by filtration. This also leads to a considerable loss of partially hydrogenated oil. As the carrier, diatomaceous earth, silicon dioxide or aluminum oxide is used. The hydrogenation typically is carried out at 170-200° C. in a stirred kettle, with the temperature of the highly exothermal reaction being not well controllable. The making of the catalyzer as a fixed bed reactor is possible, but is not thought to make sense technically, since with the highly exothermal reaction it is necessary in sequence to execute three steps for the required temperature control. [http://www.soci.org/SCI/publications/2001/pdf/pb95.pdf, TRENDS IN THE DEVELOPMENT OF EDIBLE OIL HYDROGENATION CATALYSTS, W T Koetsier and M C Lok, Unichema International (now Synetix), Emmerich, Germany and Billingham, UK 1998, ISSN 1353-114X].

All in all the exchange of material in the hydrogenation of oils imposes a high demand on the reactor [Veldsink, et al. Heterogeneous Hydrogenation of Vegetable Oils: A Literature Review, Catal. Rev.-Sci. Eng., 39 (1997) 253-318]. Since the hydrogenation represents a "fast" reaction not only the oil to be hydrogenated but also the hydrogen must be quickly delivered in sufficient amounts to the catalyzer. The balance of water/metal hydride at the catalyzer moreover influences the isomerization at the catalyzer. With good supply of hydrogen there results from the selective hydrogenation of the naturally appearing cis-double bond compounds fewer trans-compounds as byproducts of the isomerization. These not naturally appearing trans-compounds are thought to be of health concern and also change the product physically, since they have higher melting points and therefore lead to a higher "solid fat content".

To improve the supply of hydrogen at the catalyzer, a membrane reactor made as a three phase reactor with inorganic membranes was tested. The oil to be hydrogenated was pumped along the catalytically active outer surface of a porous membrane and hydrogen was supplied from the membrane rear side. [Veldsink, Selective Hydrogenation of Sunflower Oil in a Three-Phase Catalytic Membrane Reactor, JAOCS 78 (2001) 443-446]. With this reactor indeed the transport problems were reduced, but it did not succeed to make available sufficiently large catalytic membrane surfaces per reactor surface. Therefore reaction times of up to several hundred hours had to be used. By increasing the reaction temperature the reaction time can indeed be shortened, however it is known that the degree of isomerization increases with the temperature and a higher trans-content must be taken into account. Another possibility for carrying out the selective hydrogenation of oils under good control of the conditions has been found by Illinitch et al. [Illinitch et al. Nanosized Palladium Loaded Catalytic Membrane: Preparation and Cis-Trans Selectivity in Hydrogenation of Sunflower Oil, Stud. Surf. Sci. Catal. 118 (1998) 55-61]. Here the inner surface of a porous polyamid membrane of nylon-6 is catalytically activated with palladium and the oil to be hydrogenated together with dissolved hydrogen is pumped through the pore system of the membrane. In comparison to a batch reactor with a 2% palladium catalyzer carried on active charcoal, an about 2% smaller 18:1 trans-value of about 12% was found with a reduction of 18:2 concentration from about 62 to about 33%. This was taken as a confirmation of the theory that less isomerization to trans-compounds is found in forced passage through catalytically activated membrane pores. The membrane of nylon-6 was activated by means of a benzene solution of palladium salt $Pd_3(OAc)_6$ or $Pd_6Cl_{12}$. With an aqueous or acetone solution of $H_2PdCl_4$ only fragile, mechanically unstable, membranes were obtained.

In the technical carrying out of the hydrogenation optimized catalyzers are used which must elaborately and with loss of product again be entirely separated since they contain poisonous nickel or other noble metals. The reaction for the selective partial hydrogenation moreover because of the highly exothermal reaction cannot be easily controlled and the trans-content of the partially hydrated product is too high. Fixed bed reactors and membrane reactors with hydrogen supply to the rear side of the membrane offer no alternatives, since they are either too elaborate (fixed bed) or too small amounts of catalyzer per membrane reactor volume can be brought to bear. The possibility of catalytically activating the interior pore system of the membranes and to use that with a forced flow through the membranes was indeed demonstrated, but the investigated material could only be catalytically activated with toxic solvents (benzene). The possibility of building the carried catalyzer into a porous membrane and to thereby obtain the reaction capability was not considered. Moreover the solvents for nylon-6 are limited. Therefore in U.S. Pat. No. 4,702,840 (Pall Corp.) it was disclosed that the preferred solvent is formic acid. Other solvents coming into question were fluid aliphatic acids such as acetic acid and propionic acid, and further phenols (including halogenated phenols), inorganic acids such as hydrochloric acid and sulfuric acid or saturated alcoholic solutions of alcohol soluble salts such as $CaCl_2$, $MgCl_2$, LiCl and other OH group carrying solvents such as halogenated alcohols. None of these solvents are distinguished by environmentally friendly characteristics, and several are downright toxic, only to be used with limitations and high costs. Moreover there exists the danger that carried catalyzers are not compatible with the acids or that the content of salts in the casting solution inadmissibly changes the reactivity and selectivity of the catalyzers.

SUMMARY OF THE INVENTION

The object of the present invention is to provide a method for the making of a polymer membrane by means of which a very efficient polymer membrane is made available and to provide a corresponding polymer membrane by means of which a high oil flow, particularly in hydrogenation, particularly of edible oils, is possible.

This object is attained by a method for the making of a polymer membrane, particularly a microporous one, whereby the polymer membrane is made from a solution, particularly a casting solution, containing at least a first polymer, and whereby a second water soluble polymer and/or oligomer, which forms phases in the solution, is a component of the solution. By the provision of a water soluble second polymer and/or oligomer, which forms phases in the solution, and which is preferably uniformly distributed in the solution, it has unexpectedly been found that polymer membranes can be made very efficiently which have relatively large and well distributed pores. The second polymer or the oligomer can be one or more detergents which especially form clusters, when for example the phase is developed. Preferably the polymer membrane in its manufacture is made by drawing.

If at least one phase is formed during the cooling of the solution or in the cooled solution, a very reliable manufacturing process is provided. Preferably the second polymer and/or oligomer in the solution experiences a thermal transition. By way of this thermal transition, which preferably corresponds to a falling below the melting temperature of the polymer and/or oligomer in the solution, the phase or the phases of the second polymer is efficiently produced in the solution. The thermal transition can also correspond to a glass temperature of the second polymer and/or oligomer in the solution. In the case where the thermal transition takes place at a temperature corresponding to the melting temperature of the polymer and/or oligomer in the solution, particularly fluid drops of the second polymer and/or oligomer can be formed in the solution which preferably are uniformly distributed. Preferably the phases or microphases are stable when falling below a specific temperature given for the particular polymer and/or oligomer in the solution in question. The phase is preferably formed within a temperature range between 0° C. and 40° C.

After the formation of the phase and preferably after the drying and the separation of the polymer membrane or the solution the phase forming second polymer and/or oligomer is washed out of the polymer membrane. This is done preferably with water. An especially efficient phase forming second polymer is a block-copolymer of propylene oxide and ethylene oxide, where particularly the propylene oxide block is arranged between two ethylene oxide blocks. Preferably the block-copolymer is a polyethylene glycol-b-polypropylene gylcol-b-polyethylene glycol-copolymer. Here especially suited for this is preferably a material having the name Pluronic of the firm BASF and especially Pluronic F38, F68, F77, F87, F88, F98, to F108 and, especially preferred, Pluronic F127.

A membrane with good catalytic effect is then achievable if a filling material, includes porous particles, is contained in the solution. The filling material is preferably uniformly statistically distributed in the solution. This can be accomplished for example by stirring the filling material into the solution. The particles are for example clusters or grains or the like with preferably a diameter size of less than 10 μm and especially preferred smaller than 1 μm. Preferably the porous particles contain $Al_2O_3$, $TiO_2$, $ZrO_2$ and/or $SiO_2$. Preferably the porous particles are comprised essentially of these components.

Especially preferred is a filling material which is mixed with or otherwise correspondingly charged with at least one catalyzer, especially palladium and/or platinum.

The first polymer is preferably polyamideimide, polysulfone, polyethersulfone, polyacrylenitrile, polyetherimide, poly(vinylidene fluoride). polyethersulfone, polyaramide, polyetheramide, polyimide and/or polyamide. Preferably given to the solution as an addition is poly(vinylpyrrolidone) (PVP) and/or a wetting and dispersing material. The wetting and dispersing material is for example a material having the name of Tego Dispers and especially Tego Dispers 700 of the Firm Tego Chemie Service GmbH, Essen, or Degussa-Goldschmidt. Preferably used as the solvent is N-methylpyrrolidone (NMP) and/or Dimethylacetamide/γ-Butyrolactone (DMAc/GBL). It is especially preferred if the manufactured membrane is subsequently activated with at least one catalyzer by impregnation. For this preferably the finished membrane is at least partially dipped into a solution containing a catalyzer material, is subsequently dried and the catalyzer activated.

The object is further solved by a polymer membrane, preferably made as above described, having an oil flow rate, particularly for an edible oil which particularly is refined, of larger than 200 l/m² h bar at 60° C. Preferably the oil flow rate is larger than 300 l/m² h bar and more especially is larger than 500 l/m² h bar. In a preferred embodiment the polymer membrane is microporous and the oil flow rate is especially achievable in the case of refined sunflower oil. Especially preferred the oil flow rate is larger 750 l/m² h bar. The given oil flow rate is especially achievable in continuous operation with the polymer membrane of the invention.

The polymer membrane is especially efficient in the hydrogenation of edible oils if a catalyzer layer is applied at least partially to the surfaces of the pores. In this case the preferred catalyzer is palladium and/or platinum. Preferably the amount of catalyzer lies between 10 mg/m² and 20 g/m² with reference to the membrane surface.

The polymer membrane is preferably applied to a fleece mat, especially a polyester fleece mat.

According to the invention a polymer membrane, as described above, is used for the hydrogenation of edible oils, especially in a membrane reactor.

The object of the invention is further solved by a membrane reactor having a polymer membrane such as described above. A method according to the invention for the operation of such a membrane reactor according to the invention includes the steps of edible oil being placed in a pressure vessel under the pressure of hydrogen and being pumped through a polymer membrane according to the invention.

If the membrane beforehand is activated with hydrogen a very efficient hydrogenation of the edible oil is possible. The activation occurs preferably in a region between 1 bar and 5 bar of hydrogen pressure and in a temperature region between room temperature and 100° C.

Preferably the membrane and/or the region of the membrane, especially in the operation of the membrane reactor, is heated. The heating occurs preferably up to 200° C., particularly up to 170° C. and more preferred up to a temperature region of 100° C.

The hydrogen pressure preferably lies between 2 bar and 50 bar and especially preferably between 4 bar and 10 bar. The pump pressure of the oil preferably lies between 1 bar and 10 bar, especially between 1 bar and 3 bar. The resulting pressure acting on the membrane is preferably between 3 bar and 60 bar.

A porous polymer membrane is developed which has a high internal porosity which can be loaded with carried catalyzer as a filling material, which polymer membrane allows a high oil flow of 200-2,000 l/m² h bar and absolute oil compatibility at temperatures of 30° C. to at least 170° C. and which in a simple way can also be catalytically activated after the making of the membrane. The catalyzer carrier to be used can also be suited to the properties and the dimensions of the membrane, that is the relationship of the membrane thickness to the carrier particles can be from 2:1 to 200:1. The catalyzer carrier consists of known materials such as diatomaceous earth, silicon dioxide, aluminum oxide, titanium dioxide, zirconium dioxide, etc. In the manufacture of membranes, preferably environmentally friendly expedients can come into use and as a coagulating bath for the membrane casting solution water can be used exclusively.

The membrane of the invention with a high catalytic activity is available for the selective hydrogenation of oils. The membrane can be made in a type of assembly of prefabricated parts with typical catalyzer carrying materials. The catalyzer carrier can be loaded with the catalyzer before its inclusion in the membrane or also can be catalytically activated after its inclusion in the membrane. The membrane material can also be catalytically activated without a catalyzer carrier and can be used for the selective hydrogenation of oils at temperatures of preferably up to 150° C.

The invention in the following, without limiting the general thought of the invention, is described by way of exemplary embodiments with reference to the drawings.

BRIEF DESCRIPTION OF THE DRAWINGS

In respect to all inventive details not more closely explained in the text reference is made to the drawings. The drawings are.

DETAILED DESCRIPTION OF THE PREFERRED EMBODIMENTS

Polymer Choice

In investigations polyamideimide and polysulfone were stored for 8 days at 100° C. in sunflower oil and showed no changes whatsoever. Polyamideimides are commercially obtainable under the tradenames Torlon® from Solvay or Vylomax® from Toyobo. Polysulfone is offered in wide choices as for example, Ultrason® from BASF, Radel® or Udel® (from Solvay, etc. Polyamideimides, polyamides and polysulfones have been found especially suited for this purpose, with however all other oil and temperature resistant polymers being capable of being used.

Catalyzer Carrier Choice:

Here a wide range of choices of suitable materials stand available for use. Generally speaking, all carriers of the above defined dimension are well suited. The interaction of carrier material with the polymer must be adapted to the method steps of the membrane making. Diatomaceous earth suits itself by its open structure and leaves no diffusion limit to be expected. A general requirement for the carrier results from the limitation of diffusion of small pores by viscous fluids such as oils. There should either be only very large pores which do not obstruct the material transport or there should be only a small porous outer surface. In order to have sufficient surface, carriers with very small particle diameters <10 µm, however better <1 µm, are preferred. For example, Aerosil® Ox 50 from Degussa (specific outer surface (BET) 50 m²/g, average particle size 0.04 µm) is advantageously used or titanium dioxide P25 (Degussa, 50 m²/g with 0.021 µm particle size diameter). As aluminum oxide Martoxide®, Martinswerk are advantageously used, for example, Type MR70 (Martinswerk, ~8 m²/g, 0.7 µm). This is only a small selection of suitable, commercially available catalyzer carriers.

In examples K1 to K5, which are described in the following, methods are described for making suitable catalytically active carried catalyzers, which are especially suited for inclusion in polymer membranes. The methods used for this provide however especially active catalyzers for the intended selected hydrogenation.

Membrane Manufacture:

The basic principles of the membrane manufacturing have been known for a long time and have been extensively documented (for example, "Basic Principles of Membrane Technology" Marcel Mulder: Kluwer/Academic Publishers/October 1996/ISBN: 0792342488; "Membrane Formation and Modification" (Acs Symposium series, No. 744). 1. Pinnau, B. D. Freeman (Eds)/American Chemical Society/February 2000/ISBN: 0841236046; "Microfiltration and Ultrafiltration", Leos J. Zeman, Andrew L. Zydney/Marcel Dekker/ 1996/ISBN: 0824797353; or especially for polyamide membranes extensively in U.S. Pat. No. 4,340,479). A general relationship of the pore size with the beginning of the nucleation through the addition of insoluble materials to the membrane drawing solution has been generally determined (see U.S. Pat. No. 4,340,479, FIG. 1). However, the manufacture of very open, large pores which also permits a high flow for viscous fluids such as oils is difficult. In general, the pore size diminishes with the concentration of the polymers in the casting solution and the proximity to the insolubility (cloud point, nucleation) in the solvent or solvent mixture. In low polymer concentrations only slightly pressure stable, mechanically unstable membranes are obtained. The addition of poly(vinylpyrrolidone) (PVP) can indeed improve this without however leading to larger pores.

Figure 1:
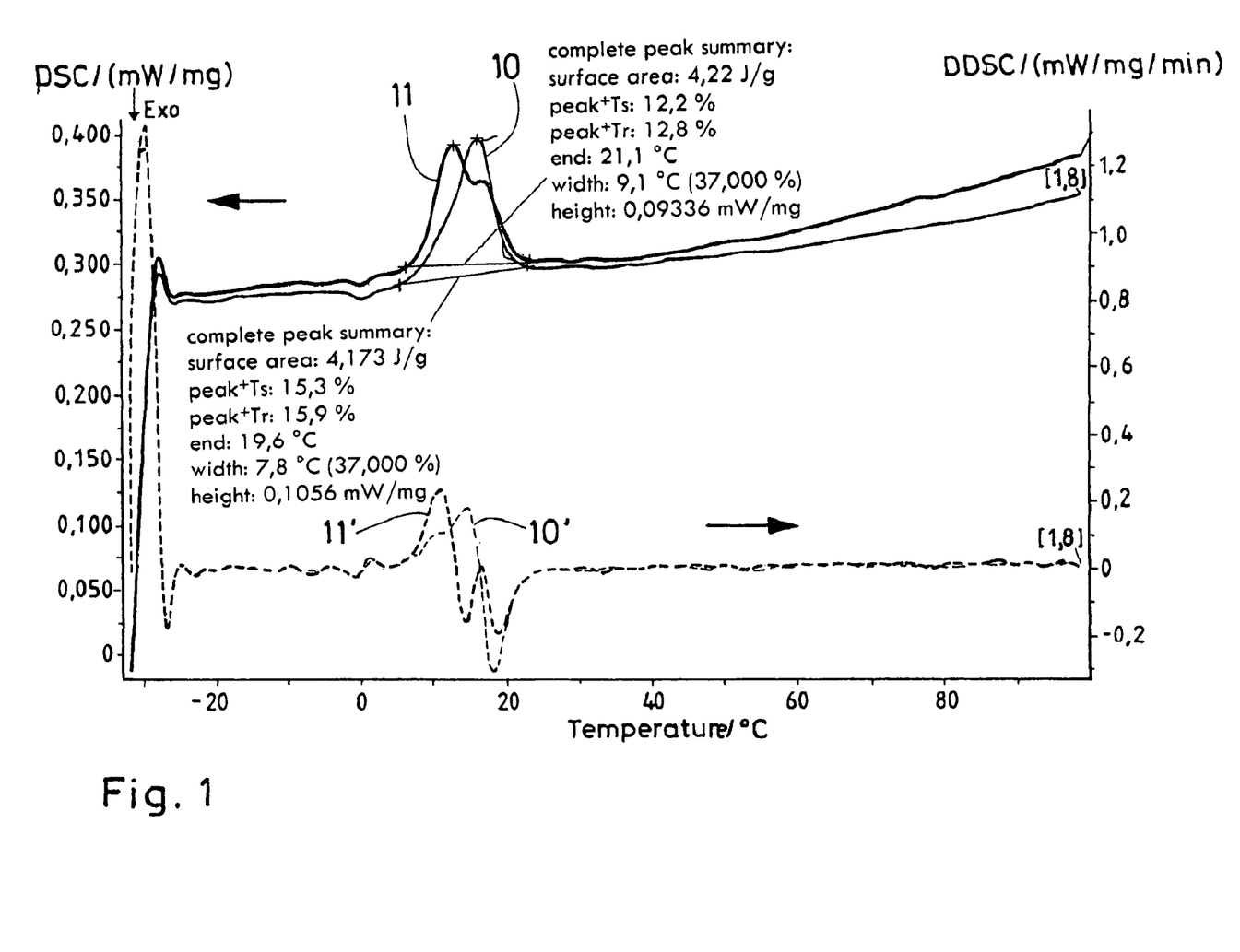
FIG. 1. a DSC-diagram of a casting solution for a membrane according to the invention in keeping with example 3 without catalyzer carrier and without a filling material, FIG. 2. a DSC-scan of a casting solution for a membrane according to example 5 with a filling material with a catalyzer carrier of Pd Al$_2$O$_3$, FIG. 3. a chemical formula for the material Pluronic F127, FIG. 4. a scanning electron microscope picture in plan view of a membrane of the invention, FIG. 5. a scanning electron microscope picture of a section of a membrane of the invention, and FIG. 6. a scanning electron microscope picture of a section of a membrane of the invention.
Figure 2:
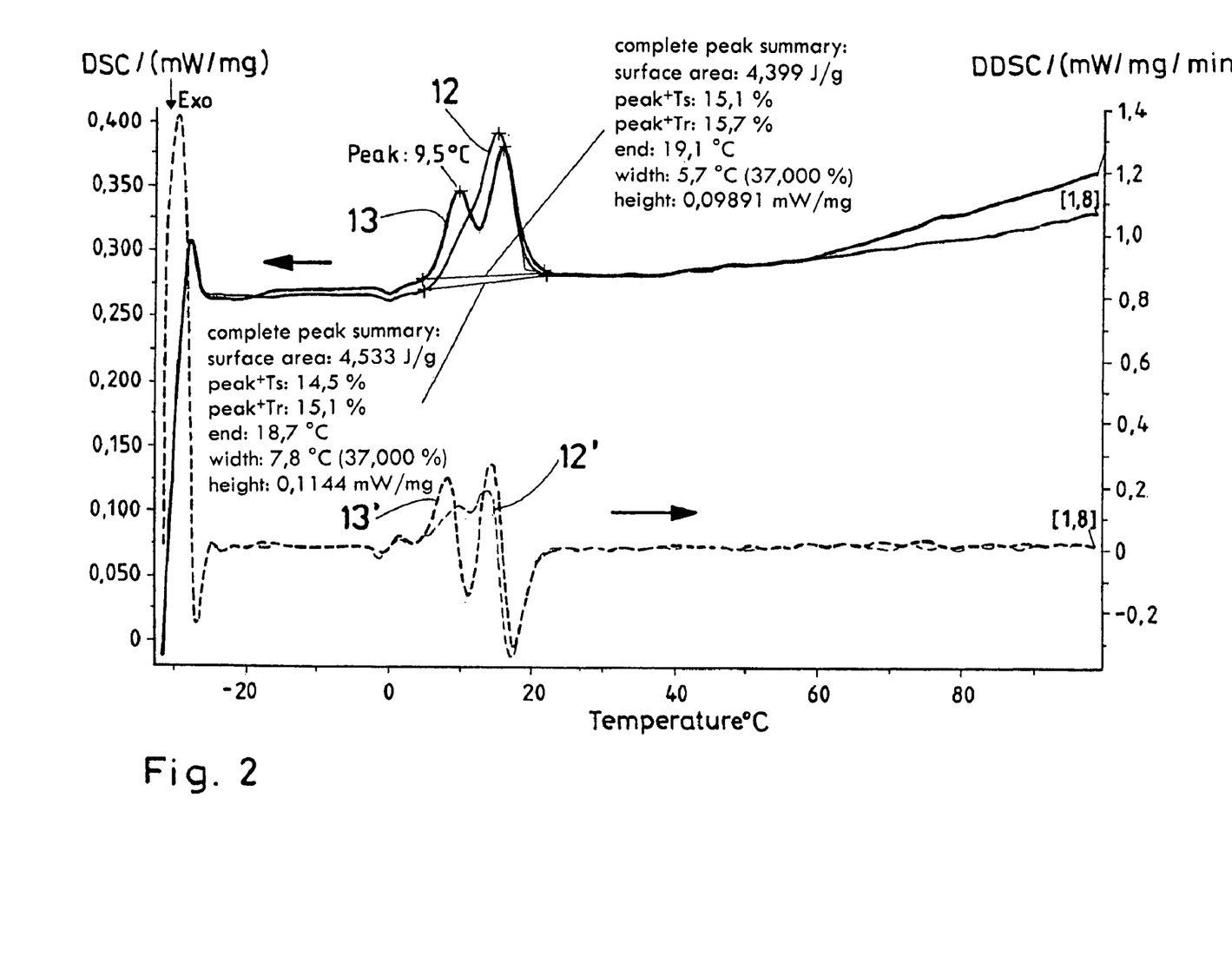

In keeping with the invention it has been found that by addition to the solution of a phase forming polymer the pore structure in respect to size can be considerably improved to enhance the flow through the pores. To this end, a polymer soluble in water and in the casting solution is added to the casting solution, which for example by a lowering of the temperature forms a microphase, does not crystallize and, finely distributed in the solution, changes the pore structure to the better with the precipitation to the membrane. This effect can be measured by thermal methods. In FIGS. 1 and 2 DSC-scans of two typical casting solutions are illustrated. The test samples were cooled to −30° C., were heated at a heating rate of 10 K/min to 100° C. and again cooled to −30° C. Test sample 1 (FIG. 1) consisted of the polymers Vylomax, Pluronic and PVP with the addition of Tego 700 (see casting solution No. 1 in example 3 and table 3), test sample 2 (FIG. 2) as in test sample 1 with the addition of Pd-containing $Al_2O_3$ according to membrane No. 1 of example 5. Upon heating, a double peak in the heating curve 11 of a melting component at 9.5 and 16° C. was found which upon rapid cooling (cooling curve) was reduced to one peak and found again at 16° C. The curves 10', 11', 12', and 13' illustrated in the lower regions of FIGS. 1 and 2 represent the differential curves, that is a differential of the upper curves per unit of time. The scale is represented on the right side. The scale of the upper curves 10, 11, 12 and 13 is illustrated at the left in FIGS. 1 and 2. The temperature is shown at the abscissa.

Figure 3:
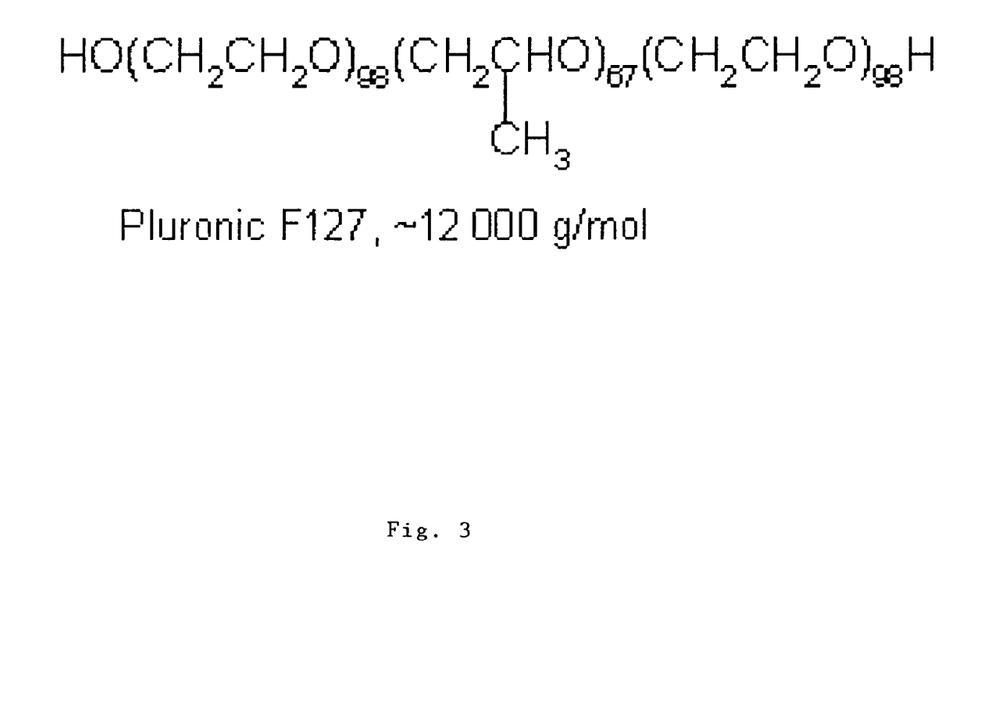

In casting solutions with or without PVP this effect is found but not however without the addition of Pluronic. Thereafter the casting solutions for membranes were tempered to 5, 9, 12, 16 and 21° C. and were processed into membranes using a membrane drawing machine (see example 2). The casting solution consisted of polyamideimid dissolved in N-methylpyrrolidone (NMP), suspended aluminum oxide and the addition of Pluronic F127 and a detergent. Pluronic F127 is a polyethylene glycol-b-polypropylene glycol-b-polyethylene glycol block-Copolymer whose structure is shown in FIG. 3. Down to the temperature of the casting solution of 16° C. (drawing temperature) only a very small $N_2$-flow and water flow was found which from a temperature of 12° C. and smaller dramatically increased. Accordingly this temperature difference of the casting solution has an effect on the oil flow. The addition of PVP does not change this temperature effect. In keeping with this it is shown in example 3 that the oil flow increases from 0 to 1500 $l/m^2$ h bar with the bubble point being raised only from 2.34 to 4.7 µm. It does not matter whether the catalyst carrier has already been catalytically activated by a metal. In keeping with this in example 5 aluminum oxide activated with Pd is included and the gap width of the drawing carriage is adjusted to 0.2 to 0.3 to 0.4 mm. It was shown that this gap width only had a marginal influence on the oil flow, the water flow however at 0.4 mm decreased to about two thirds.

This effect cannot be explained by an increase in hydrophilicism because of the inserted PVP or Pluronic, since the flow increases similarly for hydrophobic oil and hydrophilic water. For pore surfaces that have become more hydrophilic indeed the water flow should increase and the oil flow on the other hand should rather decrease.

If however instead of aluminum oxide a silicon dioxide is used this effect is produced less strongly, but nevertheless still present. Because of the poorer compatibility of the silicon dioxide with the polyamideimid in comparison to aluminum oxide the oil flow is halved only from about 1500 $l/m^2$ h bar to 500-800 $l/m^2$ h bar (see example 4). This effect however is not limited to polyamideimid as the membrane polymer. So also in the case of polysulfones with the lowering of the drawing temperature below the critical value of 12° C. an oil flow of 400 to 1300 $l/m^2$ h bar is found (see example 1). From examples 1-5 one can recognize that the relationship of $N_2$—/$H_2O$—/oil flow is about 2000/20/1 and the bubble points lie between 4 and 10 bar.

The porosities of the membranes of the invention were gravimetrically determined by filling the pores with a fluorine containing, high boiling point liquid with low surface tension. For this, customary fluids were used which are sold under the trade names Porewick or Galwick. For the membranes described in the examples a pore volume of 0.5 to 2.5 $l/m^2$ was found. With increasing gap height in the membrane making the pore volume was increased from 1.4 (200 µm) to 1.6 (300 µm) to 2.0 (400 µm) $l/m^2$. The numbers in brackets are related to the gap height in the drawing of the membrane.

The addition of polyethylene glycol containing polymers or oligomers is known per se in the making of membranes. For this reference is made, for example, to U.S. Pat. No. 6,565,782, Pall Corp. concerning polysulfone membranes which are drawn by known methods from casting solutions with the additions of polyethylene glycol and poly(vinylpyrrolidone) and achieving a water flow from 180 to 730 $m^3/m^2$ h bar. The average pore sizes measured with a Permporometer are between 1.5 to 5 µm. Similarly in U.S. Pat. No. 6,071,406 (Whatman Inc.) PEG 300, gamma-butyrolactone and Pluronic 10R5 are added to the casting solution of polysulfone membranes, in order to obtain a hydrophilic membrane for good water flow. At a bubble point at about 3 bar a water flow of about 13 $m^3/m^2$ h bar is obtained. In U.S. Pat. No. 6,495,043 (Kalsep Limited), a polyethylene glycol containing oligomer is added to polysulfone or polyethersulfone. The oligomer is based on a diamine of the general formula R1(R2)N—CH2-CH2-N(R3)R4 and shows in aqueous filtration an improved water flow of 230 at first and in the process 80 $l/m^2$ h bar. In the membranes according to the invention preferably Pluronic is used, which has a different basic structure (see FIG. 3, which shows the structure of Pluronic F127). Pluronic is a trade name of the firm BASF.

In the cited US patents the achieved oil flow is distinctly lower than in the present examples and the casting solutions are not cooled below a temperature which allows the polyethylene glycol containing polymer to form microphases.

As said, the membranes obtained in the above described way can already have catalytic activity. It is however also possible to activate the accessible pore system of the membranes of the invention by a subsequent treatment. For this the method of calcination can be used, as described for the carried catalyzers in examples K1-K5, only up to the thermal stability of the membranes of about 200° C. However there also exists the possibility of the chemical reduction of catalyzer precursors previously applied into the pore system of the membrane. These consist preferably of soluble metal salts. The solvent for this is so chosen that it does not attack the polymer membrane and does not change the pore structure. Accordingly, e.g. tetrahydrofurane is excluded as a solvent since with it the pores are made smaller by irreversible swelling. The preferred solvent here consists of water. For improving the dispersion of the catalyzer in the pore system citric acid or other dispersion enhancers can be added. Alcohol can also serve as the solvent in similar fashion. After the evaporation of the solvent at increased temperature either (1) thermally below about 200° C. unstable catalyzer precursors can be calcined at this temperature, or (2) a chemical reduction is carried out. Here preferably a sodium-boron hydride solution in alcohol or in an alcohol/water mixture is used. However all chemicals for the reduction can be used which do not adversely change the pore system of the membranes. In examples 6-8 this procedure is further elaborated. In this way catalyzer metals can be applied, to 60 $g/m^2$ of the membrane surface. However, the optimum catalyzer content lies between 0.5 and 1 $g/m^2$ of the membrane surface.

By the addition of oligomers or polymers which by way of temperature change form microstructures in the polymer casting solution, very open membranes can be made. These are distinguished by a very high flow of gases and liquids and are especially suited for very high flows of viscous fluids. By the addition of catalyzer containing filling materials and/or by a subsequent treatment with a catalyzer precursor these membranes are made to be catalytically reactive and can be used for chemical reactions in a membrane reactor. Especially advantageous here is the carrying out of reactions with viscous fluids, such as for example the selective hydrogenation of oils in the fluid phase.

With the use of environmentally compatible chemicals, especially non-toxic or only slightly toxic solutions, catalytically reactive membranes are made available in industrial quantities. The membranes can be used in a new process for the selective hydrogenation of oils. The polymer membranes exhibit in contrast to inorganic membranes, for example of aluminum oxide, no fouling in continuous operation.

Figure 4:
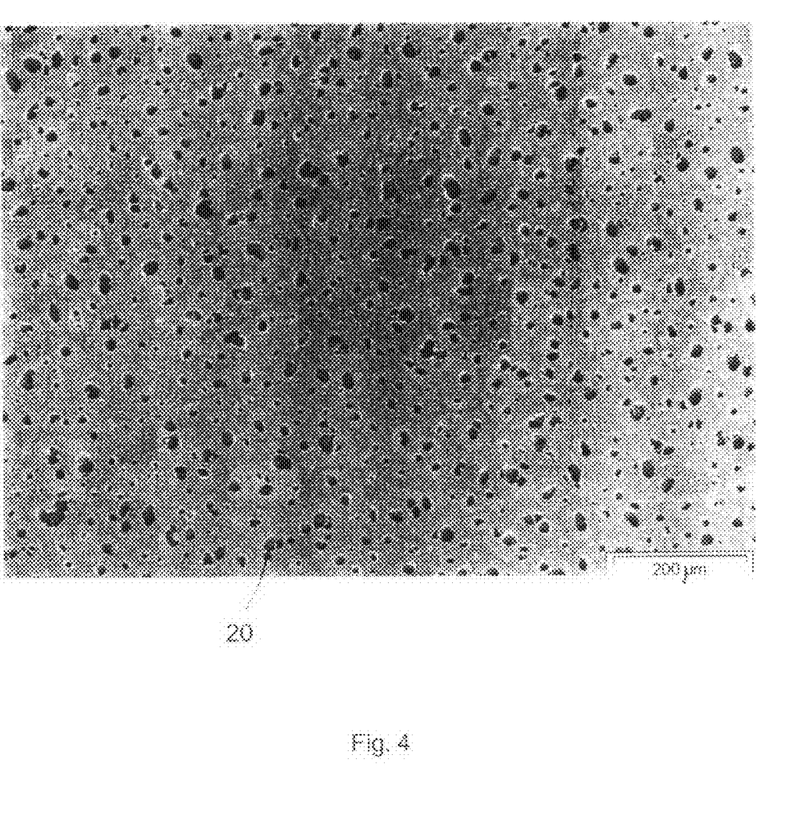

FIG. 4 shows a scanning electron microscope picture of a membrane according to the invention in plan view. In this picture which shows nearly 1 mm$^2$ of the membrane the uniform distribution of the pores 20 is especially easy to be seen. A scale is given at the lower right in FIG. 4.

FIG. 5 shows the membrane of the invention of FIG. 4 in a sectional view in a scanning electron microscope picture in an enlarged scale. A membrane 25 is applied to a carrier fleece mat 21. The corresponding pores 20 are visible, with only one pore being provided with a reference number.

Figure 6:
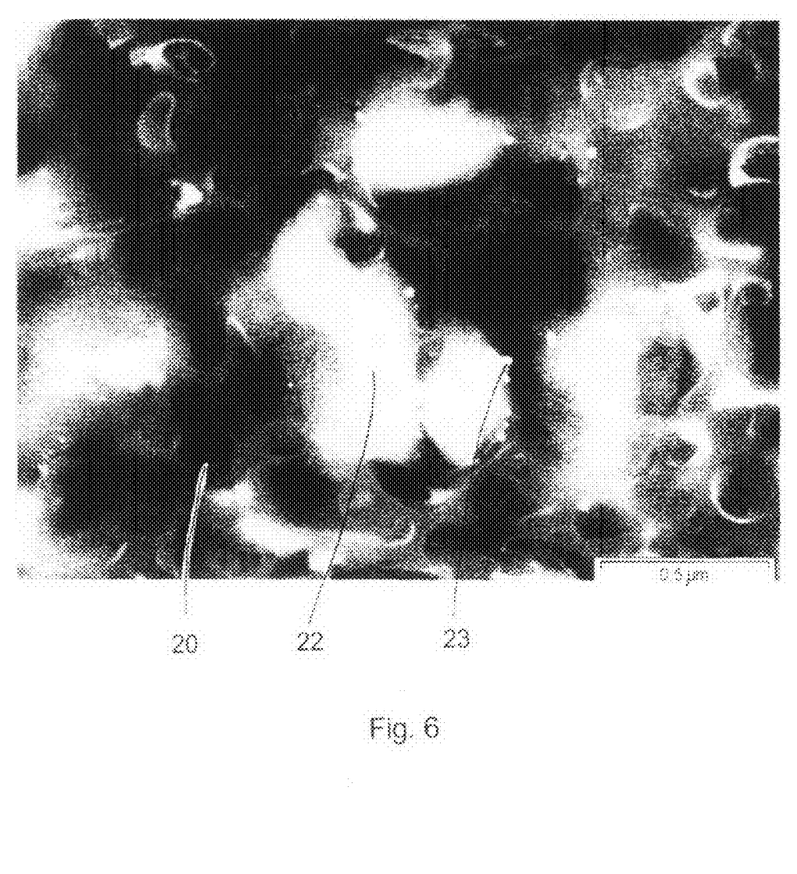

FIG. 6 shows a section of FIG. 5 in a distinctly increased scale. Small, essentially black pores 20 can be recognized and also filling material clusters 22 for example of $Al_2O_3$. On the filling material clusters 22 are arranged as a type of bright noses catalyzer clusters 23. The catalyzer layers made by the subsequent activation are not visible seen in this Figure, since the catalyzer material is too well distributed for it to be seen in this scanning electron microscope picture with its corresponding resolution.

MANUFACTURING EXAMPLES

Catalyzer Manufacture

The activation capability of the catalyzers so manufactured is so high that they can be activated for hydrogenation in a hydrogen stream at room temperature (RT).

Example K1

2% noble metal (Pd, Pt) is applied onto or into $Al_2O_3$. The given percentages, insofar as not otherwise indicated and as they do not concern material or substance components, are weight percentages. 170 mg $PdCl_2$ or 250 mg $H_2PtCl_6$ were dissolved in 50 ml thinned HCl ($PdCl_2$) or deionized $H_2O$, and 1 g aluminum dioxide (MR 70, Martinswerk) was suspended in the salt solution with strong stirring and stirred for at least two hours. The suspension was evaporated at the Rotavapor, was dried for two hours at 80° C. and was calcined for 9 h (heating rate 3.6° C./min) at 450° C. Yield 90-95%.

Example K2

2% Pt was applied onto or into $Al_2O_3$ from a neutralized solution. 180 mg $H_2PtCl_6$ was dissolved in 4 ml $H_2O$, 2.5 g $Al_2O_3$ (Martoxid MR70), was ultrasonically suspended in 4 ml $H_2O$ and both were combined. The suspension had a pH value of 1.2 (measurement with pH-electrode) and with diluted $NH_3$ (1%) the pH value was adjusted to 9. This was stirred for 0.5 h and then evaporated. One half of bright yellow powder (K2a) was dried and calcined (see example K1) and the other half was chemically reduced with aqueous-methanolic sodium-boron hydride solution (K2b), was neutrally washed and dried at 110° C.

Example K3

2% Pt was applied onto or into $Al_2O_3$ from non-aqueous solution. 2 g $Al_2O_3$ was suspended in 4 ml THF by stirring, 100 mg $H_2PtCl_6$ was dissolved in 4 ml THF and dripped into the $Al_2O_3$ suspension. The mixture was stirred 0.5 h and then evaporated. One half of the bright yellow powder (K3a) was dried and calcined (see example K1), the other half was reduced with $NaBH_4$ (K3b) and was neutrally washed and dried at 110° C.

Example K4

2% Pt was applied onto or into $SiO_2$. Following this was an activation by citric acid.

a). 50 mg $H_2PtCl_6$ was dissolved in 10 ml $H_2O$, 1 g silicon oxide (Aerosil OX 50) was introduced into the solution with heavy stirring and the suspension was further stirred for 2 h. The mixture was evaporated at the Rotavapor, was dried for 2 hours at 80° C. and was calcined 9 h at 450° C. (See example K1). Yield 0.97 g bright gray powder (95%).

b). as a), additionally 350 mg citric acid monohydrate together with $H_2PtCl_6$ was dissolved in the $H_2O$.

Example K5

2% Pt was applied onto or into $Al_2O_3$. The activation followed with poly(vinylpyrrolidone) (PVP).

50 mg $H_2PtCl_6$ and 400 mg PVP K15 (Fluka) were dissolved in 7 ml EtOH, and after the addition of 4 ml $H_2O$ the solution was refluxed for 5 h. The color of the solution changed from orange to black. After cooling 1 g $Al_2O_3$ was added and stirred for 2 h. Evaporation, drying, calcining as in Example K1.

Membrane Manufacture

Example 1

Each 60 g polyethersulfone (Radel PXM 3000, Solvay) was dissolved in 425 g DMAc/GBL (5:1). Different amounts (24, 30 g) of Pluronic F127 (Ethylene oxide-propylene oxide-block copolymer, BASF), of the filling material aluminum oxide (Martoxid MR 70, Martinswerk) and of the detergent Tego Dispers 700 (Goldschimdt) were added. The solutions or suspensions were tempered and degassed in light vacuum. In a membrane drawing machine the solutions or suspensions were poured onto polyester fleece mat (TH100, Hirose) (gap width 0.2 mm, drawing speed 2.5 m per min) and precipitated in water bath. Remaining solvent in the membranes was removed at increased temperature with water and the membranes were dried at 100° C.

$N_2$-permeability, bubble points, water flow and oil flow were determined. The value of the "bubble points" were measured with a so called capillary flow porometer of the firm PMJ Europe, Belgium, or the firm Porous Materials Inc., USA.

TABLE 1

| No. | Drawing Temperature ° C. | Pluronic g | Filling material/ detergent g/g | Bubble Point μm | $N_2$-Flow $m^3/m^2$ h bar | $H_2O$-Flow $l/m^2$ h bar | Oil Flow (60° C.) $l/m^2$ h bar |
|---|---|---|---|---|---|---|---|
| 1 | 20 | 24 | 0/0 | <0.015 | 105 | — | — |
| 2 | 20 | 30 | 0/0 | <0.015 | 220 | — | — |
| 3 | 7 | 24 | 30/2.5 | 4.4 | 3000 | 27000 | 1300 |
| 4 | 9 | 24 | 30/0 | 4.5 | 1200 | 800 | 400 |
| 5 | 9 | 24 | 30/0.25 | 4.4 | 1300 | 500 | 400 |

Example 2

800 g of a polyamideimide-solution (15% Vylomax® in NMP, Toyobo) was diluted with 170 g NMP, and supplemented with 48 g Pluronic F127, and after complete solution 1.09 g Tego Dispers 700 (Goldschmidt) was introduced. The solution was stirred two days at room temperature.

70 g aluminum oxide was suspended with the help of ultra sound at the Rotavapor in 100 ml NMP (3 h) and subsequently was well stirred into the polymer solution. The polymer-$Al_2$-suspension was divided into five portions and they were processed at different temperatures of the casting solution with a membrane drawing machine as in Example 1. The basic data of the membranes were measured and presented in Table 2.

TABLE 2

| No. | Drawing Temperature ° C. | Bubble Point μm | $N_2$-Flow $m^3/m^2$ h bar | $H_2O$-Flow $l/m^2$ h bar | Oil Flow (60° C.) $l/m^2$ h bar |
|---|---|---|---|---|---|
| 1 | 21 | 2.5 | 25 | 5 | not measurable |
| 2 | 16 | 2.5 | 40 | 30 | not measurable |
| 3 | 12 | 8.8 | 2800 | 36000 | 1370 |
| 4 | 9 | 9.0 | 3000 | 33000 | 1600 |
| 5 | 5 | 3.9 | 2700 | — | 1380 |

Example 3

400 g Vylomax-solution was diluted with 70 ml NMP, supplemented with 24 g Pluronic, 0.5 g Tego and 10 g poly (vinylpyrrolidone) (PVP K30 (MW 40000), Fluka) and was stirred overnight at 40° C. One half of the degassed solution was cooled to 9° C., the other half remained at room temperature. The membranes were drawn according to Example 1, and the bubble point, $N_2$-flow, $H_2O$-flow and oil flow were measured (see Table 3).

TABLE 3

| No. | Drawing Temperature ° C. | Bubble Point μm | $N_2$-Flow $m^3/m^2$ h bar | $H_2O$-Flow $l/m^2$ h bar | Oil Flow (60° C.) $l/m^2$ h bar |
|---|---|---|---|---|---|
| 1 | 9 | 4.7 | 2300 | 18000 | 1500 |
| 2 | RT | 2.35 | 10 | — | not measurable |

Example 4

200 g Vylomax-solution was supplemented with 12 g Pluronic and 5 g PVP K30 and stirred. 17.5 g $SiO_2$ (Aerosol OX 50, Degussa) was suspended with ultrasound with 0.25 g Tego in 70 ml NMP and put into the pre-prepared Vylomax-solution. The suspension was stirred at room temperature for two days and then the membranes were drawn at 9° C. or room temperature (gap width 0.3 mm, otherwise as in Example 1). Repetitions were carried out with increasing $SiO_2$-content under otherwise identical conditions. The results are given in Table 4.

TABLE 4

| No. (content $SiO_2$) | Drawing Temperature ° C. | Bubble Point μm | $N_2$-Flow $m^3/m^2$ h bar | $H_2O$-Flow $l/m^2$ h bar | Oil Flow $l/m^2$ h bar |
|---|---|---|---|---|---|
| 1 (27%) | 9 | 9.2 | 1800 | 43000 | 1400 |
| 2 (43%) | 9 | 8.2 | 2000 | 23000 | 1100 |
| 3 (53%) | 9 | 10.5 | 1900 | 60000 | 1820 |
| 4 (53%) | 21 | 4.8 | 670 | 400 | 780 |
| 5 (60%) | 21 | 4.1 | 710 | — | 530 |

Example 5

800 g Vylomax-solution was thinned with 70 ml NMP, was supplemented with 48 g Pluronic and 20 g PVP K30 and stirred two days until a clear solution was created. 70 g catalyzer powder made according to Example K1 (Pd/$Al_2O_3$) was suspended in 50 ml NMP together with Tego and added to the Vylomax-solution. The suspension was stirred over night and tempered to 9° C. Membrane drawing as in Example 1. The gap width was increased from 0.2 mm (A) to 0.3 mm (B) to 0.4 mm (C).

TABLE 5

| No. | Drawing Temperature ° C. | Bubble Point μm | Pore Volume l/m² | $N_2$-Flow m³/m² h bar | $H_2O$-Flow l/m² h bar | Oil Flow l/m² h bar |
|---|---|---|---|---|---|---|
| 1 (A) | 9 | 9.2 | 1.4 | 2100 | 32000 | 1500 |
| 2 (B) | 9 | 8.2 | 1.6 | 2400 | 33000 | 1300 |
| 3 (C) | 9 | 7.8 | 2.0 | 1600 | 19000 | 1250 |

Catalytic Activation of Membranes

The interior surfaces of the porous membranes are preferably layered with the catalyzer with the method described here. Since the interior pore system of the membrane is layered with the catalyzer in fine dispersion there results many times higher dispersion of the catalyzer per inner surface area of the pore system in comparison to the given membrane surface. In Examples 6-8 the amount of catalyzer is referenced to the given membrane surface. The coating solution can also be further supplemented with agents enhancing the dispersion such as citric acid (anionic) or polyethylenimine (cationic) (see for example K4).

Example 6

Membrane Activation by Impregnation with Pd

Pre-prepared round membrane pieces (diameter for example 7.4 or 8.9 or 13.0 cm, suitable for membrane cells with 35, 55 and 100 cm membrane surface) were brought with their upper sides into a 5% solution of $PdCl_2$ in diluted HCl without being submerged. After several seconds the pore volumes of the membrane pieces were filled with the solution and uniformly colored brown. Excess solution was allowed to drip off. The membranes were dried at 110° C. The process could be repeated several times according to need. The dried membrane pieces were reduced with a $NaBH_4$ solution (1% in $H_2O$/methanol (1/1)) whereupon they immediately turned black. After the drawing the amount of applied Pd was gravimetrically determined.

Results for 43 cm Membrane Pieces:

1× impregnated-12 to 16 mg Pd (corresponds to 2.7 to 3.7 g Pd/m² membrane surface)

2× impregnated-24 to 30 mg Pd (corresponds to 5.6 to 6.9 g Pd/m² membrane surface)

3× impregnated-45 to 60 mg Pd (corresponds to 10 to 14 g Pd/m² membrane surface)

Example 7

Membrane Activation by Impregnation with Pt

The same procedure as in Example 6 was carried out except that a solution of $H_2PtCl_6$ in $H_2O$ (3-5%) was used.

By alternating impregnation in $PdCl_2$ and $H_2PtCl_6$ solutions a mixture of Pd catalyzer and Pt catalyzer was applied to the membranes.

2× impregnation in $PdCl_2$, reduction in $NaBH_4$, 1× impregnation in $H_2PtCl_6$, reduction produced for example 25 mg Pd/10 mg Pt each per m² membrane surface.

Example 8

Automated Membrane Activation with Pt

In a small membrane coating device, the membrane pores were filled with a solution of the salt of the catalyzer precursor by dipping.

After dipping with a 3% $H_2PtCl_6$ solution in water or ethanol, preliminary drawing with warm air and subsequent drying in a drying chamber at 100° C. was carried out. Pieces in test cell size were stamped from the coated membrane web and reduced in $NaBH_4$ solution (methanol/water 1:1).

The applied amount of Pt was determined by TXRF (Roentgen-Total Reflection): an activated membrane piece of about 1 cm² size was heated in 2 ml aqua regia (3 parts concentrated HCl/1 part concentrated nitrate acid) to 60° C. until all of the Pt had gone into solution. Yttrium nitrate solution (1%), was added as a standard. Depending on the membrane and the concentration of the metal salt solution 0.1 to 5 g Pt/m² was applied.

According to the same method, all other catalyzers obtainable by chemical reduction can be brought into the membrane pore system. In a membrane drawing machine with built in drying the dried membrane can also be reduced to a catalytically reactive membrane chemically by dipping.

Example 9

Automated Membrane Activation with Catalyzer

As in Example 8 the membrane pores were filled with a salt of the catalyzer precursor. To this end, the salt of the catalyzer precursor was dissolved in a solvent and supplemented with citric acid. By simple temperature treatment, through the addition of the citric acid, the entire reduction to active catalyzer could be carried out at temperatures of 150 to 200° C. with the color of the membrane changing from bright brown or bright brownish-red after drying with warm air to dark brown or gray after the temperature treatment at 150 to 200° C. By this method the catalytically active metal is especially stably fixed into the membrane pores. The thus manufactured membranes have a similar activity as the membranes reduced by the wet chemistry method (see Example 8).

factor for the progress for the hydrogenation. The iodine value of untreated sunflower oil lies between 127-130.

TABLE 6

| No | Mass g | Cat. Precursor | Metal Content % | Water g | Methanol g | 2M HCl g | Citric Acid g | Citric Acid % | Cat. Precursor % | Cat.- Content % | Temp. Treatment |
|---|---|---|---|---|---|---|---|---|---|---|---|
| 1 | 0.431 | $H_2PtCl_6 \cdot 6H_2O$ | 40 | 13.94 | | | 3.143 | 17.95 | 2.46 | 0.98 | Warm Air predried 16 h 105° C., 2 h 200° C. calcined |
| 2 | 0.431 | $H_2PtCl_6 \cdot 6H_2O$ | 40 | 13.94 | | | 3.143 | 17.95 | 2.46 | 0.98 | Warm Air predried 2 h 200° C. calcined |
| 3 | 0.431 | $H_2PtCl_6 \cdot 6H_2O$ | 40 | 13.94 | | | 3.143 | 17.95 | 2.46 | 0.98 | Warm Air predried 8 h 105° C., 5 h 125° C. 16 h 150° C. calcined |
| 4 | 0.400 | $PdCl_2$ | 60 | | 9.6 | 0.614 | 2.920 | 21.58 | 2.96 | 1.77 | Warm Air predried 11 h 150° C., calcined |
| 5 | 0.401 | $Pd(CH_3COO)_2$ | 48 | | 9.6 | | 2.922 | 22.61 | 3.10 | 1.49 | Warm Air predried 11 h 150° C., calcined |

Hydrogenation of Sunflower Oil in Membrane Reactor

General Specification:

The hydrogenation tests were carried out under 4 bar hydrogen pressure and at 100° C. 500 ml commercial, refined sunflower oil was placed in a thermostatised pressure vessel under hydrogen pressure, heated and by means of a gear pump was pumped through the porous membranes. Before this the membrane was activated with hydrogen at 1 bar and 30° C.

Heatable membrane test cells with 35, 55 and 100 cm$^2$ membrane surfaces were used. The permeate was recirculated into the container. The total pressure in the apparatus was at 5-6 bar (pump pressure and H$_2$ pressure). This is the total pressure difference across the membrane. Typically the reaction was pursued for 8 h and samples (3 ml) were taken every 2 h.

Following a saponification with methanolic KOH the test samples were analyzed in gas chromatographs (Column SP 2680 (100 m, Suppelco), carrier gas helium, FID). The GC analyses delivers the trans-fat acid content, while the iodine value (IV) of the remaining oil represents the summation Example 10

35 cm$^2$ membrane surface/high metal content or catalyzer previously applied to Al$_2$O$_3$ (see membranes No. 3 (Pd) and 8 (Pt)).

The pre-prepared membrane pieces were activated by impregnation according to Examples 6-8 (except for membranes No. 3 and 8), and after the reduction the applied amounts of metal were determined gravimetrically or by TXRF. The hydrogenation occurred according to the above general specification.

TABLE 7

| No. | base membrane | Metal Content A = Pd/B = Pt mg | Filling Material | iodine value | Trans-Fat Acid Content % | Stearic Acid Content % |
|---|---|---|---|---|---|---|
| 1 | Tab3 No1 | A 62 | — | 105 | 26 | 4.2 |
| 2 | Tab3 No1 | A 56 | — | 113 | 15 | 4.4 |
| 2 | Tab2 No4 | A 45 | Al$_2$O$_3$ | 115 | 14 | 4.2 |
| 3 | Tab5 No3 | A 1 | Pd/Al$_2$O$_3$ | 114 | 17 | 5.0 |
| 4 | Tab3 No1 | B 76 | — | 109 | 10 | 8.7 |
| 5 | Tab5 No3 | B 61 | Al$_2$O$_3$ | 114 | 6 | 7.7 |
| 6 | Tab5 No1 | B 35 | Al$_2$O$_3$ | 111 | 8 | 8.4 |
| 7 | Tab3 No1 | B 22 | — | 102 | 13 | 9.8 |
| 8 | Tab5 No1 | B 0.5 | Pt/Al$_2$O$_3$ | 120 | 7 | 5.9 |

Example 11

100 cm$^2$ Membrane Surface/Low Metal Content

The pre-prepared membrane pieces were activated according to Example 3 with H$_2$PtCl$_6$, the applied Pt amount was determined by TXRF. The hydrogenation resulted according to the general specification.

TABLE 8

| No. | base membrane | Pt-Content g/m² | Filling Material | iodine value (8 h) | Trans-Fat Acid (8 h)/% | Stearic Acid (8 h)/% |
|---|---|---|---|---|---|---|
| 1 | Tab3 No1 | 0.35 | — | 75 | 34 | 13.2 |
| 2 | Tab4 No4 | 0.5 | SiO₂ | 83 | 34 | 9.8 |
| 3 | Tab2 No4 | 0.4 | Al₂O₃ | 85 | 24 | 11.6 |
| 4 | Tab4 No1 | 0.4 | SiO₂ | 86 | 27 | 11.5 |
| 5 | Tab4 No4 | 0.9 | SiO₂ | 87 | 21 | 11.7 |
| 6 | Tab5 No1 [a] | 0.3 | Pd/Al₂O₃ | 91 | 27 | 9.9 |
| 7 | Tab2 No4 | 0.3 | Al₂O₃ | 94 | 16 | 10.1 |
| 8 | Tab3 No1 | 0.02 | — | 96 | 21 | 9.3 |
| 9 | Tab5 No1 | not determined | Al₂O₃ | 102 | 19 | 7.9 |
| 10 | Tab5 No1 | 0.2 | — | 105 | 12 | 8.7 |

[a] contains Pd in the filling material (corresponding to 0.1 g Pd/m² membrane surface)

The invention describes the manufacture of a membrane with high catalytic activity for the selective hydrogenation of oils. Through the addition of oligomers or polymers, which through a temperature change produce microstructures or fibers in the polymer casting solution, very open membranes can be made. These membranes distinguish themselves by very high flows of gases and liquids, especially oils, and are especially suited for very high flows of viscous fluids. By the addition of catalyzer containing filling materials and/or by the subsequent treatment with catalyzer precursors these membranes become catalytically reactive and can be efficiently used for chemical reactions in a membrane reactor. Especially advantageous is the carrying out of reactions with viscous fluids as for example the selective hydrogenation of oils in the fluid phase.

With the use of environmentally compatible chemicals, especially nontoxic or very slightly toxic solutions, catalytically reactive membranes can be made available in industrial quantities. These membranes can be used in a new process for the selective hydrogenation of oils. The polymer membranes of the invention show, in contrast to inorganic membranes, for examples of aluminum oxide, no fouling in continuous operation. Advantageously, porous polymer membranes loaded with filling material carrying catalyzers for the hydrogenation of oils are made available. As preferred polymers polyamideimide, polyamide and polysulfone are used. Serving as catalyzer carriers are materials such as diatomaceous earth, aluminum oxide, silicon oxide etc. For influencing the pore structure in the precipitation of the membranes the casting solution is supplemented by a polymer which is soluble in the casting solution and in water. A subsequent catalytic activation of the accessible pore system of the membranes according to the invention can for example take place by coating the interior surfaces of the pores with catalyzer or by their impregnation with palladium and/or platinum.

| Reference Number List | |
|---|---|
| 10, 10' | cooling curve |
| 11, 11' | heating curve |
| 12, 12' | cooling curve |
| 13, 13' | heating curve |
| 20 | pore |
| 21 | carrier fleece mat |
| 22 | filling material cluster |
| 23 | catalyzer cluster |
| 25 | membrane |

What is claimed is:

1. A method for the making of a microporous polymer membrane comprising the following steps:
   preparation of a casting solution with a first polymer, a water soluble and phase forming second polymer and/or oligomer and with a filling material including porous particles, wherein the second polymer and/or oligomer is a block-copolymer of propylene oxide and ethylene oxide,
   formation of at least one additional phase or microphase of the second polymer and/or oligomer in a temperature range between 0° C. and 40° C., wherein the second polymer and/or oligomer undergoes a thermal transition in the solution, taking place at a temperature which corresponds to a melting temperature or a glass transition temperature of the polymers and/or oligomers in the solution,
   casting a membrane by drawing of the solution in a temperature range between 5° C. and 12° C.,
   drying and precipitation of the drawn solution, and
   washing out of the second polymer and/or oligomer from the polymer membrane;
   wherein the filling material is supplemented with at least one catalyst, particularly palladium and/or platinum.

2. The method according to claim 1, wherein the block-copolymer is a polyethylene glycol-b-polypropylene glycol-b-polyethylene glycol block-copolymer.

3. The method according to claim 1, wherein the porous particles contain Al₂O₃, TiO₂, ZrO₂ and/or SiO₂.

4. The method according to claim 1, wherein the first polymer includes polyamideimide, polysulfone, polyethersulfone, polyacrylonitrile, polyetherimide, poly(vinylidene fluoride), polyaramide, polyetheramide, polyimide and/or polyamide.

5. The method according to claim 1, wherein the solution is supplemented by poly(vinylpyrrolidone) (PVP) and/or wetting and dispersion material.

6. The method according to claim 1, wherein as the solvent N-methylpyrrolidone (NMP) and/or dimethylacetamide/γ-butyrolactone (DMAc/GBL) is used.

7. The method according to claim 1, wherein the membrane is subsequently activated by impregnation with at least one catalyzer.

8. A method for the making of a microporous polymer membrane comprising the following steps:
   preparation of a casting solution with a first polymer, a water soluble and phase forming second polymer and/or oligomer and with a filling material including porous particles, wherein the second polymer and/or oligomer is a block-copolymer of propylene oxide and ethylene oxide, formation of at least one additional phase or microphase of the second polymer and/or oligomer in a temperature range between 0° C. and 40° C., wherein the second polymer and/or oligomer undergoes a thermal transition in the solution, taking place at a temperature which corresponds to a melting temperature or a glass transition temperature of the polymers and/or oligomers in the solution, casting a membrane by drawing of the solution in a temperature range between 5° C. and 12° C., drying and precipitation of the drawn solution, washing out of the second polymer and/or oligomer from the polymer membrane, and subsequently activating the manufactured membrane by impregnation with at least one catalyzer.

9. The method according to claim 8, wherein the block-copolymer is a polyethylene glycol-b-polypropylene glycol-b-polyethylene glycol block-copolymer.

10. The method according to claim 8, wherein the porous particles contain $Al_2O_3$, $TiO_2$, $ZrO_2$ and/or $SiO_2$.

11. The method according to claim 8, wherein the first polymer includes polyamideimide, polysulfone, polyethersulfone, polyacrylonitrile, polyetherimide, poly(vinylidene fluoride), polyaramide, polyetheramide, polyimide and/or polyamide.

12. The method according to claim 8, wherein the solution is supplemented by poly(vinylpyrrolidone) (PVP) and/or wetting and dispersion material.

13. The method according to claim 8, wherein as the solvent N-methylpyrrolidone (NMP) and/or dimethylacetamide/γ-butyrolactone (DMAc/GBL) is used.

14. The method according to claim 1, wherein the propylene oxide block is arranged between two ethylene oxide blocks of the second polymer and/or oligomer.

15. The method according to claim 8, wherein the propylene oxide block is arranged between two ethylene oxide blocks of the second polymer and/or oligomer.

* * * * *